Nov. 17, 1942.　　　G. WINTRITZ　　　2,302,084
MANUFACTURE OF SLIDE FASTENERS
Filed April 4, 1939　　　4 Sheets-Sheet 1
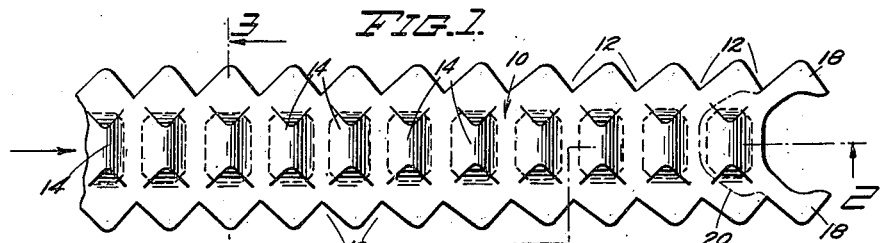
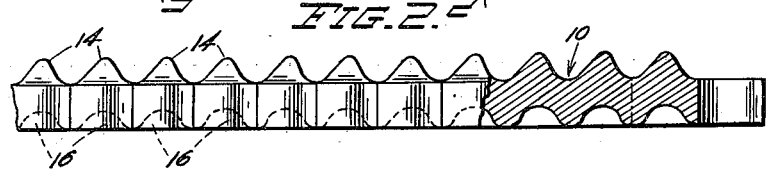
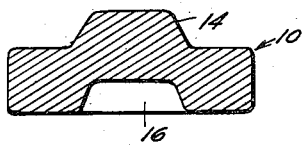
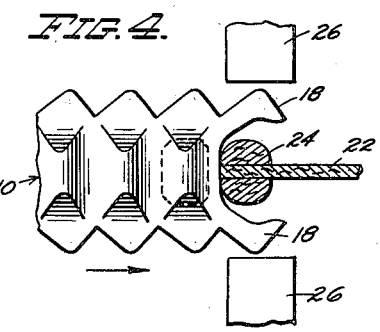
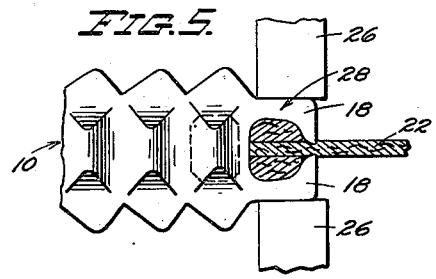
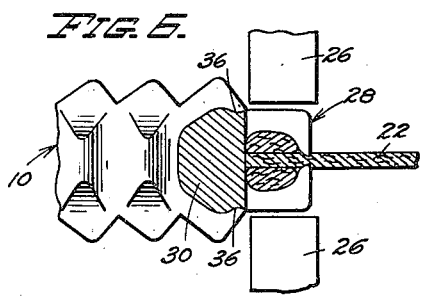
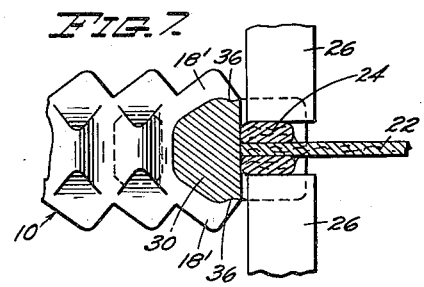
INVENTOR
*GEORGE WINTRITZ*
BY
*James K. Franklin*
ATTORNEY Nov. 17, 1942.   G. WINTRITZ   2,302,084
MANUFACTURE OF SLIDE FASTENERS
Filed April 4, 1939   4 Sheets-Sheet 2
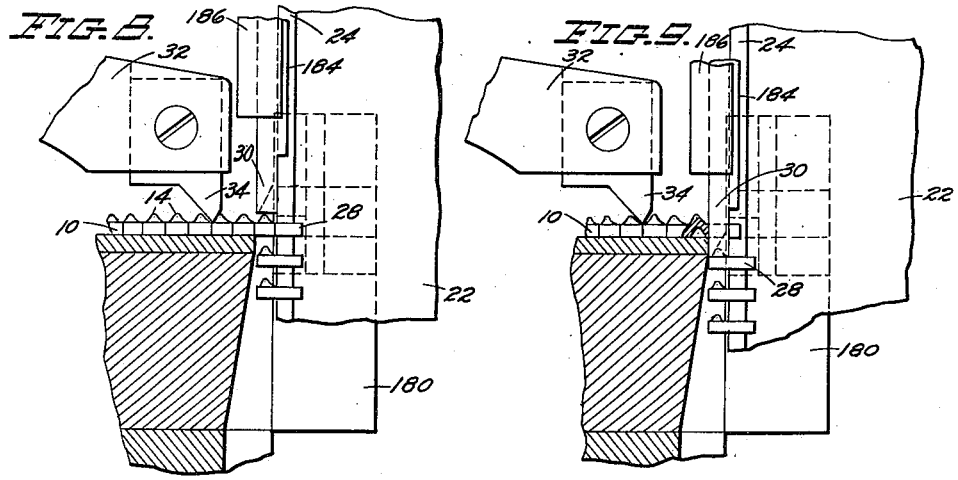
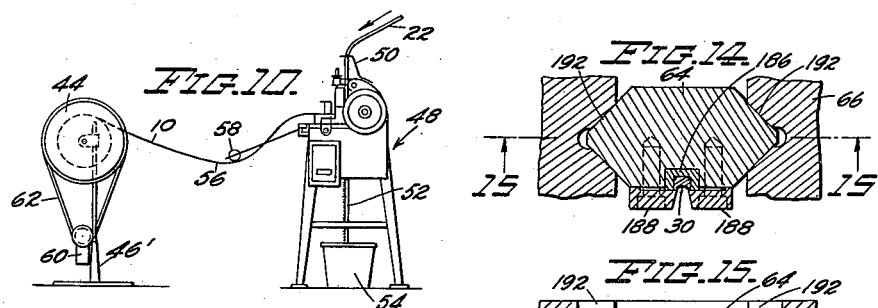
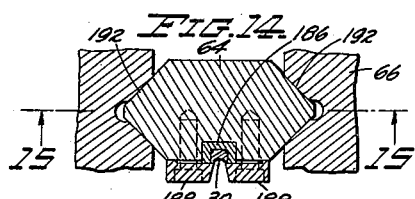
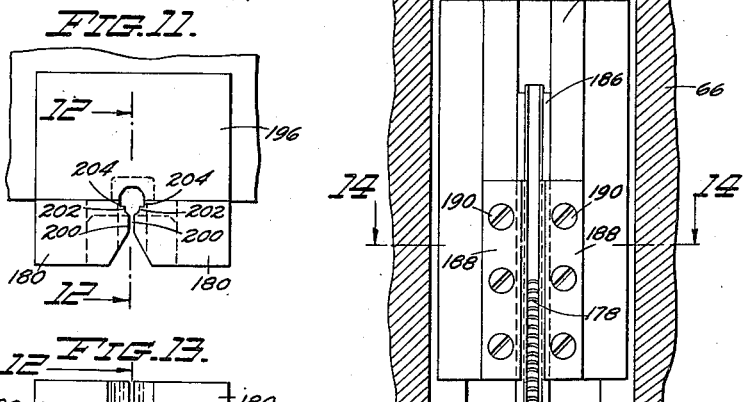
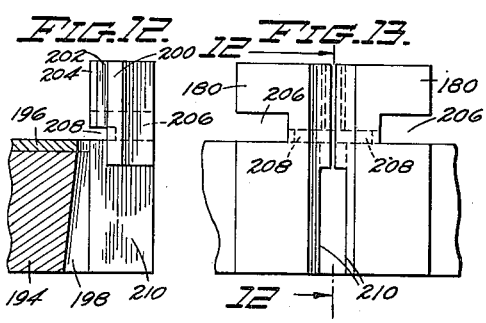
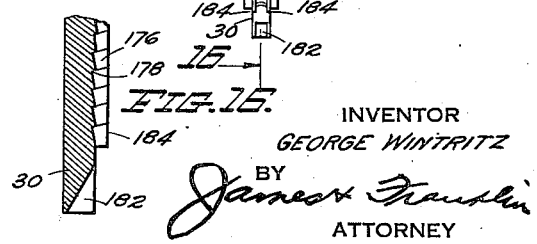
INVENTOR
GEORGE WINTRITZ
BY
ATTORNEY

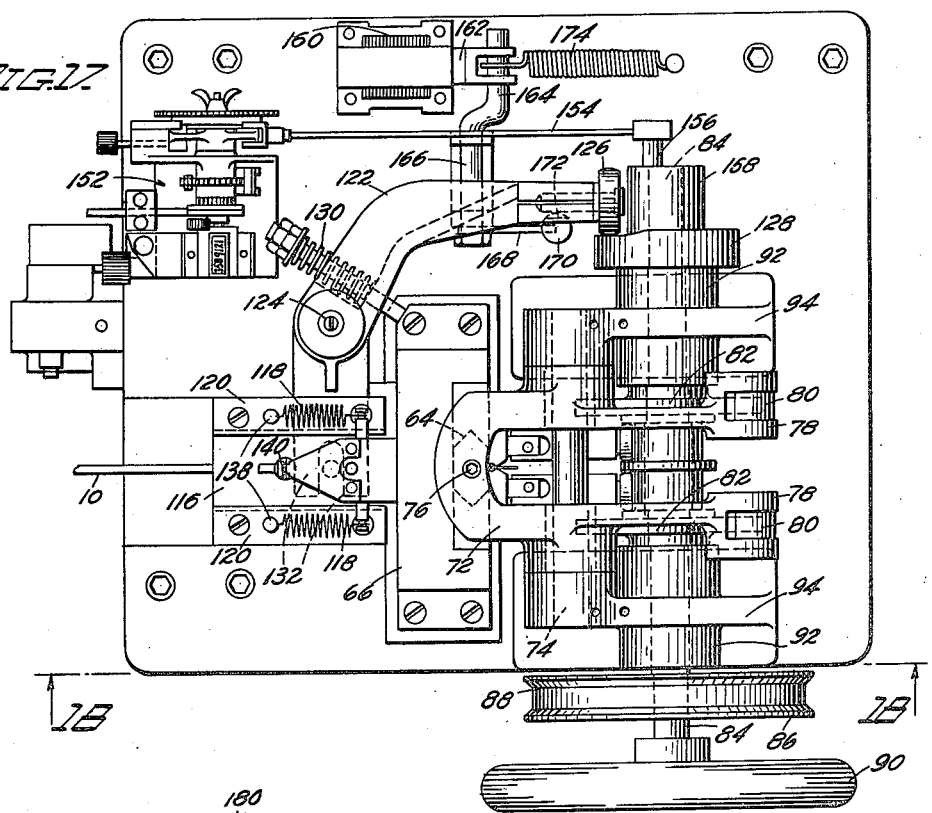

Nov. 17, 1942.  G. WINTRITZ  2,302,084
MANUFACTURE OF SLIDE FASTENERS
Filed April 4, 1939  4 Sheets-Sheet 4

INVENTOR
GEORGE WINTRITZ
ATTORNEY

Patented Nov. 17, 1942

2,302,084

UNITED STATES PATENT OFFICE 2,302,084

MANUFACTURE OF SLIDE FASTENERS

George Wintritz, Staten Island, N. Y., assignor to Conmar Products Corporation, Bayonne, N. J., a corporation of New Jersey Application April 4, 1939, Serial No. 265,899

26 Claims. (Cl. 153—1)

This invention relates to slide fasteners, and more particularly to an improved method and apparatus for manufacturing the same.

The primary object of my invention is to generally improve the manufacture of slide fasteners. A more particular object is to greatly simplify the apparatus for such manufacture. Still another object is to provide an improved apparatus for using a special wire or strip of embryo fastener elements, said strip having notched or serrated side edges conforming to the ends of spread jaws, and having a series of projections and recesses along the faces thereof, said serrations and projections and recesses being so spaced as to correspond to fastener elements in which the head of one element is nested within and fills the space between the spread jaws of the next element. The individual elements may be formed from such a strip by severing the wire without scrap or waste metal.

Further objects of my invention center about the feed of the tape on which the elements are being attached. It is customary to provide special tape feed means for intermittently feeding the tape. The pitch or spacing between elements on the tape is not always as accurate as might be desired. Objects of the present invention are to make the tape feed more accurate, and to completely eliminate special tape feed means such as have heretofore been employed. With these objects in view, I clamp the jaws at the end of the wire against the beaded edge of the tape, and then sever the clamped element from the wire by means of a punch disposed immediately adjacent the edge of the tape and moving in the direction of the same. The stroke of the punch is made adequate to feed the severed element and the tape on which it is clamped an amount equal to the desired pitch or spacing of the elements along the tape. Another object of the invention is to eliminate the check-dog or holding dog, commonly used in connection with the wire feed means in order to hold the wire against return movement during retraction of the wire feed dog.

Other objects of the invention center about the provision of a gap or space at intervals along the tape, thus dividing the tape into successive lengths or stringers. To provide such a gap or space, the feed of the wire to the tape is interrupted, and an object of the present invention is to provide for continued feed of the tape when no elements are being clamped thereon. For this purpose, the tape is fed by means of the aforesaid punch, and the side wall of the punch engaging the tape is preferably roughened or serrated to insure the desired tape movement. An ancillary object is to effectively prevent possible return movement of the tape during retraction of the punch, and this object is fulfilled by gripping the tape to hold the same stationary as the punch returns. In accordance with a further feature and object of the invention, the tape is gripped by the regular clamping means which is normally used to clamp the jaws of the elements against the tape.

To the accomplishment of the foregoing and other objects which will hereinafter appear, my invention consists in the method steps and apparatus elements, and their relation one to the other, as hereinafter are more particularly described in the specification and sought to be defined in the claims. The specification is accompanied by drawings, in which:

Fig. 1 is a plan view of a piece of strip or wire used in practicing the present invention;

Fig. 2 is a partially sectioned side elevation thereof, the section being taken in the plane of the line 2—2 of Fig. 1;

Fig. 3 is a transverse section taken approximately in the plane of the line 3—3 of Fig. 1;

Figs. 4, 5, 6 and 7 are schematic views, looking in plan, and explanatory of successive steps in the operation of the apparatus;

Figs. 8 and 9 are sections taken in elevation through the apparatus, and are explanatory of the successive stages in the operation of the same;

Fig. 10 is an over-all view of one form of apparatus embodying the present invention;

Fig. 11 is a plan view of a die and tape guide used in the apparatus;

Fig. 12 is a section in elevation taken in the plane of the line 12—12 of Fig. 11;

Fig. 13 is an elevation of the tape guide shown in Fig. 11;

Fig. 14 is a section through the ram and punch assembly taken in the plane of the line 14—14 of Fig. 15;

Fig. 15 is a section taken in the plane of the line 15—15 of Fig. 14;

Fig. 16 is a section through the punch, and is taken in the plane of the line 16—16 of Fig. 15;

Fig. 17 is a plan view of the head of the apparatus shown in Fig. 10;

Fig. 18 is a side elevation of the same, taken inside the pulley, that is, on the line 18—18 of Fig. 17;

Fig. 21 is a detail explanatory of the relation between the punch and tape guide; and Fig. 22 shows the completed fastener element attached to a tape.

Figure 19:
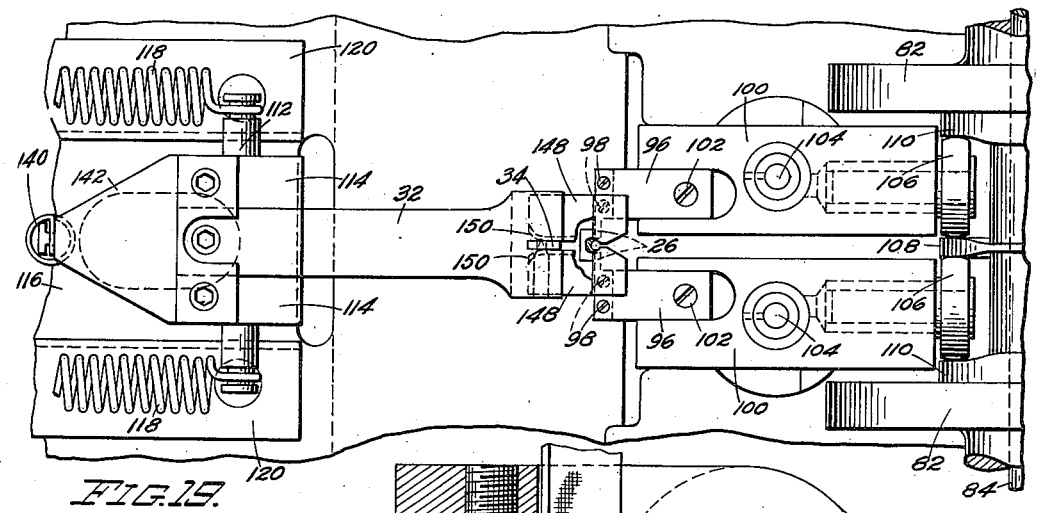
Fig. 19 shows a part of the machine in plan, and to somewhat enlarged scale, with the ram housing and rocker removed.

The present invention operates upon a wire or strip, the nature of which may be explained with reference to Figs. 1, 2 and 3 of the drawings. This strip, generally designated 10, is a generally flattened strip having notched or serrated side edges, as is indicated at 12. It is also provided with a series of interlocking means, or more specifically, a series of projections 14 on one side, and a series of recesses 16 on the opposite side. The indentation of the metal at the recess 16 may be used to provide metal for the desired projection 14, as will be clear from inspection of Fig. 3. The notched side edges 12 correspond to the ends of spread jaws, while the projections 14 and recesses 16 correspond to the interlocking means conventionally provided on the head of slide fastener elements. The spacing of the notches and projections and recesses is very close, and corresponds to slide fastener elements in which the head of one element is nested within and fills the space between the jaws of the next element. This will be clear from inspection of the right-hand end of Fig. 1, in which the spread jaws are shown at 18, while the outline of the head which is next to be formed is indicated by the dot-and-dash line 20. The shearing of the endmost element from the wire 10 provides the spread jaws for the next element. It will be observed that the elements are formed without scrap or waste.

The method of the present invention may be explained with reference to Figs. 4 through 9 of the drawings. Referring first to Fig. 4, the wire 10 is fed toward a tape 22 until the spread jaws 18 are astride the beaded edge 24 of the tape. The apparatus includes a pair of oppositely movable clamping fingers 26, and at this time these fingers are spread apart to the fully opened position shown in Fig. 4. The clamping fingers 26 are next moved together, as shown in Fig. 5 in order to clamp the jaws 18 against the beaded edge of the tape. It will be observed that the configuration of the wire 10 is such as to permit this closing of the jaws 18 even before the endmost element, designated 28, is severed from the wire. The clamping fingers 26 next open slightly, as shown in Fig. 6, whereupon a severing punch shown in section at 30, descends and functions to sever the clamped element 28 from the wire. It also functions to feed the element and together with it the tape, as will be described in connection with Figs. 8 and 9. As a refinement, which is not essential, but the advantage of which will be pointed out later, the clamping fingers 26 may next come together over a large distance until they grip the beaded edge 24 of tape 22, as is clearly shown in Fig. 7. This preferably takes place before the punch 30 rises, following which the fingers 26 are moved to the wide open condition of Fig. 4, and the wire 10 is advanced until the jaws 18' (Fig. 7) of the next element are moved astride the beaded edge of the tape.

Referring now to Fig. 8 of the drawings, the wire 10 is intermittently fed toward the tape 22 by means of a feed dog 32. The tooth 34 of the feed dog acts upon the projections 14 of the wire 10. The punch 30 is shown in elevated position, where it remains until after the wire 10 has been fed forward by feed dog 32 and until after the clamping fingers have clamped the endmost element 28 on the tape, as was described in connection with Figs. 4 and 5 of the drawings. The clamping fingers are released, and the punch 30 then descends, as shown in Fig. 9 of the drawings, thereby severing the element 28 from the wire 10. The stroke of punch 30 is substantially greater than that needed to merely shear the endmost element from the wire, and in fact, is made exactly the amount needed to feed the severed element 28 and together with it the tape 22 downwardly a distance equal to the desired pitch or spacing of the elements along the tape. This dispenses with the need for special tape feed means.

The feed dog 32 is retracted to the position shown in Fig. 9, thus preparing the same for its next forward or feed movement. The feed dog 32 is preferably retracted while the punch 30 is still down. This is not essential, but is desirable because it eliminates the necessity for using the conventional check-dog or holding dog for preventing return movement of the wire during retraction of the feed dog. The reason the punch may be used to hold the wire will be clear on referring to Fig. 22 of the drawings showing the finished element 28 attached to the tape 22. The element is slightly necked or reduced in width at the point 36 so that the sides of the head are convergent toward the jaws rather than strictly parallel. This provides an undercut or interlocked relation between the punch having such an outline, and the next element, or rather, the wire. This will also be clear from inspection of Figs. 6 and 7 in which the punch 30 and wire 10 are shown to be interlocked at the points 36. Of course, the underlying reason for the illustrated configuration of punch 30 is in order to provide substantial bearing surfaces at the ends of the jaws for bearing against the tape, as is shown at 38 in Fig. 22. Advantage may be taken of this undercut relation to eliminate the usual holding dog for the wire.

In connection with Fig. 22, it may be well to point out that the element finally produced is of generally conventional type in that the jaws when closed have parallel side walls 40 and end walls 42 which are substantially perpendicular to the side walls 40 and to the tape 22. Furthermore, the width or spacing between the side walls 40 is equal to the width of the head except, of course, at the indentations 36, which, however, do not change the manner in which the elements cooperate with the slider of the slide fastener. It is primarily with a view to producing conventional parallel-sided elements of this character, that the strip or wire 10 is provided with notched or serrated side edges, as shown in Fig. 1.

The over-all appearance of the apparatus of the present invention is illustrated in Fig. 10. The wire 10 is unreeled from a large reel 44 of wire, this reel being rotatably mounted on a suitable stand 46. The wire is fed to an attaching and severing apparatus generally designated 48. The tape 22 is fed through a suitable top guide 50 downwardly to the clamping fingers and punch previously referred to. The tape with the fastener elements secured therealong, marked 52 in the drawings, is fed downwardly from the head of the machine 48 to a suitable receptacle or basket 54. In order to reduce the load on the wire feed mechanism, a loop 56 of slack wire may be provided between the reel 44 and machine 48, this slack being controlled by means of a feeler 58 controlling a switch which starts and stops a motor 60 which is connected to reel 44 by means of the belt 62.

Figure 20:
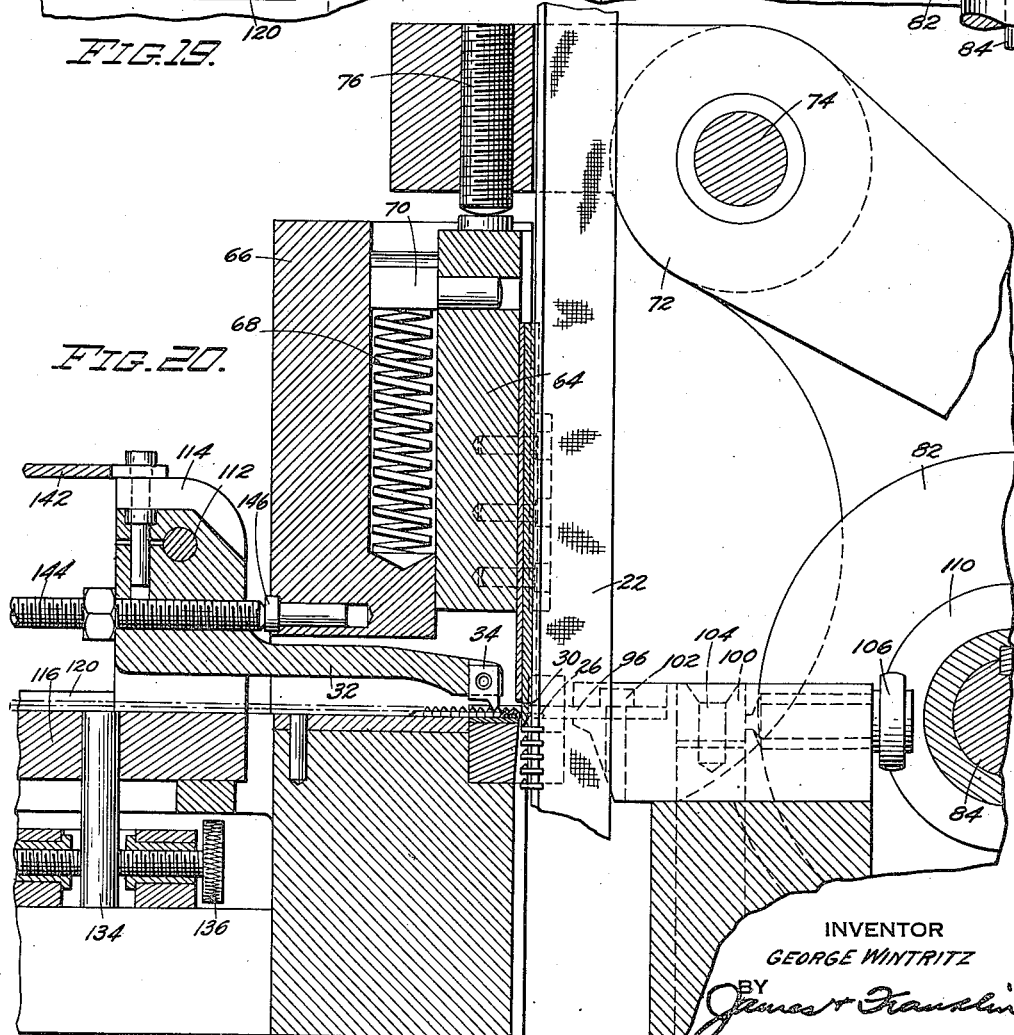
Fig. 20 is a section taken in elevation through the part of the machine shown in Fig. 19, with the ram housing and rocker in position.

Referring now to Fig. 20 of the drawings, the punch 30 is shown in down position. The punch is secured to a ram 64 vertically slidable in the ways or guides of a stationary ram housing 66. The ram is elevated by means of spring 68 bearing against a block 70 connected to ram 64. The ram is moved downwardly by means of a rocker 72 pivoted at 74 and bearing against the ram by means of an adjusting screw 76. Referring now to Figs. 17 and 18, it will be seen that rocker 72 is a generally U-shaped member the closed end of which carries the screw 76, and the rearwardly extending arms 78 of which carry cam follower rollers 80 which ride on cams 82 carried on the main timing shaft or cam shaft 84 of the machine. Shaft 84 carries a pulley 86, and is driven by a belt 88 connected to a suitable driving motor preferably located beneath the head of the machine. Wheel 90 acts as a fly wheel and also acts as a hand wheel for the machine. The shaft 84 is carried in stationary main bearings 92, while the pin 74 on which rocker 72 is mounted, is carried in bearings formed at the upper ends of bearing pedestals 94.

Reverting now to Figs. 19 and 20, the clamping fingers 26 previously referred to are secured to clamping plates 96, as by means of the screws 98. Clamping plates 96 are themselves secured in mating slots in clamping levers 100, as by means of the screws 102. Clamping levers 100 are pivoted at 104, and at their opposite ends carry cam follower rollers 106. These run between cylindrical cams 108 and 110, said cams providing positive movement of the clamping levers in both directions. The design of the cam surfaces is, of course, so selected as to obtain the desired four-stage movement of the clamping fingers which was described in connection with Figs. 4 through 7 of the drawings. The cams 108 and 110 are mounted on the man cam shaft or timing shaft 84, previously referred to.

The feed dog 32 is also clearly shown in Figs. 19 and 20 of the drawings. This feed dog is oscillatable on a pin 112 carried in ears 114 projecting upwardly from a slide 116. The slide is normally pulled toward the left by means of springs 118 which are connected at their forward ends to extensions of the pin 112 previously referred to. The slide 116 moves in tracks or guides formed in the head of the machine and is held in place by suitable gibs 120.

Referring now to Figs. 17 and 18, the slide 116 is moved by means of a feed arm 122 pivoted at 124. Feed arm 122 carries a cam follower roller 126 running on a cylindrical cam 128 carried by the aforesaid main shaft 84. The roller is held in engagement with the cam, as by means of compression spring 130, the inner or right-hand end of which bears against the feed arm. The opposite end 132 of the feed arm is disposed beneath the slide 116, and is forked or branched to come on opposite sides of a pin 134 projecting from said slide 116. The position of the slide may be adjusted by means of the screws 136. The manner in which the return springs 118 are connected at their fixed ends to stationary pins 138 will also be clear from these figures.

The feed dog 32 (Fig. 20) is held yieldably downwardly against the wire by means of a pull spring 140 (Fig. 18) tensioned between a stationary arm 142 and a screw 144 (Fig. 20) projecting rearwardly from the dog. The screw 144 also serves to limit the forward movement of the feed dog, and thereby determines the position of the jaws at the end of the wire, with respect to the tape, preparatory to the attaching and severing operations. The end of screw 144 bears against a hardened insert 146 disposed in the ram housing 66.

Referring now to Fig. 19, guide blocks 148 are mounted on top of the die, these guide blocks receiving and accurately guiding the wire as it is operated upon by the tooth 34 of the feed dog and the punch. The guide blocks are channeled to form top ledges 150 which overlie the serrated edges of the strip and hold the same against vertical movement. In this way the strip or wire is confined against either sideward or upward movement as it is fed beneath the severing punch.

The apparatus as so far described will form a continuous stringer of fastener elements, for no mechanism for gap spacing between stringers has been described up to this point. The apparatus is useful even without gap spacing, for the reason that a certain proportion of the output of a manufacturer is made in the form of a continuous stringer. This is done in order to fill emergency orders for which there is no time to set up the attaching machine and counting apparatus to make a specific stringer color of desired width and length, or to fill small orders, for which it does not pay to do so.

However, the specific machine here illustrated includes a counter and additional mechanism for gap spacing, and this mechanism is next described. Referring first to Fig. 17, the counter is generally designated 152. It is operated by a connecting rod 154 which in turn is connected to a crank pin 156 carried at the end of hub 158 of the feed cam 128. The counter may be of any desired character, and it functions to close an electric circuit for a predetermined time or predetermined number of revolutions of the machine, after a desired number of elements has been attached to the tape. The counter is wired to energize a solenoid 160 (Figs. 17 and 18) which attracts solenoid core 162, moving the same to the left as viewed in the drawing, and thereby oscillating a crank 164 in counterclockwise direction. The shaft 166 of crank 164 carries a finger 168, the end of which is received in a pocket in a vertically movable stop post 170. The stop post is normally in the down position shown in Fig. 18, at which time the upper end of the stop post is lower than the feed arm 122. However, upon energization of solenoid 160, the stop post 170 is raised until its upper end comes into the path of the feed arm, this taking place when the feed arm is in outermost position. Post 170 may be provided with a flattened surface 172 (Fig. 17) at its upper end against which the feed arm bears. It will be evident that the feed arm is thus held in outermost position despite continued rotation of the feed cam 128. This arrests the wire-feed dog in forward position and interrupts feed of the wire to the tape. When the solenoid is de-energized, the core 162 is pulled back to initial position by means of return spring 174.

The punch 30 continues to reciprocate, and the punch is so designed as to cause continued feed of the tape in order to produce the desired gap or space between stringers. Referring to Figures 15 and 16, it will be seen that the side of the punch which bears against the beaded edge of the tape is channeled as indicated at 176 to fit around a part of the tape bead and to increase the bearing surface therebetween. Furthermore, the resulting concave channel 176 is preferably roughened or provided with a series of serrations or teeth 178 best shown in Fig. 16. These teeth are so directed as to tend to feed the tape downwardly but not upwardly. Broadly, it may be said that the punch (or punch holder or ram) is provided with means reciprocating with the punch and engaging the tape to help feed the same.

In the present case the end of the punch helps form the fastener element, while the side of the punch helps feed the tape. Considerable pressure may be exerted between the punch and tape, for, as is best shown in Fig. 21, the beaded edge 24 is confined against movement away from the punch by the configuration of the tape guides 180.

The tape should not rise when the punch rises, and any suitable means may be provided engaging the tape to permit forward yet prevent backward movement of the same. Also, grippers may be provided which grip the tape and hold the same stationary as the punch rises. In the present case the clamping fingers for the jaws of the fastener element have been combined with such grippers, and the same fingers are used for both purposes, although they are functionally distinct. Specifically, the clamping fingers 26 come all the way together and grip the beaded edge of the tape, as is best shown in Fig. 7, just before the punch 30 rises.

The timing of the machine is such that punch 30 is up, and clamping fingers 26 are spread apart, when feed dog 32 advances the wire. The parts are then in the relation shown in Figs. 4 and 8 of the drawings. The clamping fingers next close the jaws against the tape, as shown in Fig. 5, and then retract slightly, as shown in Fig. 6, whereupon the punch descends as shown in Fig. 9. As soon as the punch descends, the feed dog is retracted and the clamping fingers 26 come together to seize the tape. The punch then rises, following which the clamping fingers 26 open wide, as shown in Fig. 4, thereby completing the operating cycle of the machine, which is then ready for the next forward or feed movement of the wire.

The construction and mounting of the punch may be described in greater detail with reference to Figures 14, 15 and 16 of the drawings. The punch 30 is preferably cut away at its lower end, as is indicated at 182, in order to clear the projection on the element being severed from the wire. The channel 176 is formed by side walls 184 (Figs. 16 and 21) extending longitudinally of the punch. These terminate above the working end of the punch, as is best shown in Figs. 15 and 16. The punch is received within and reinforced by a spacer 186 (Figs. 14 and 15), and the latter is mounted in the ram 64. The punch and spacer are held in position on ram 64 by means of clamps 188 which are secured to the face of the ram by means of screws 190. The edges of clamps 188 just overlie and bear tightly against the side walls 184 of punch channel 176 previously referred to. In this way, a space is left between the clamps 188 for reception of the beaded edge of the tape. The ram 64 is slidable in suitable guides or ways 192 formed in the ram housing 66 previously referred to.

The construction of the tape guide and die may be described with reference to Figures 11, 12 and 13 of the drawings. The die comprises a die block 194 surmounted by a die plate 196. The die plate is suitably hardened and is replaceable, but otherwise functions as though the die block 194 and plate 196 were made integrally. The passage for the heads of the severed elements is preferably divergent or enlarged beneath the die plate 196, as is indicated at 198 in Fig. 12.

The tape guide comprises two blocks 180 having surfaces 200 which come closely together on opposite sides of the tape. The blocks are concaved at 202 to fit closely about the rear part of the beaded edge of the tape. The blocks are then stepped or recessed at 204 (see also Fig. 21) to receive the walls 184 of punch 30.

The blocks 180 are cut away at 206 (Fig. 13) to receive the clamping plates, which were numbered 96 and described in connection with Fig. 19. The blocks are also cut away at 208 (Figs. 12 and 13) to receive the clamping fingers, which were numbered 26 and described also in connection with Fig. 19. Below the slots 206 and 208 for the clamping fingers and blades, the tape guide surfaces are cut away in the manner indicated at 210 in Figs. 12 and 13.

Friction tending to restrain downward movement of the tape is provided by the fit of the tape between the guide walls 200 and the fit of the tape bead between the tape guide and the punch. Additional friction producing means may be added, if desired.

The rise of the punch is minimized to bring the punch just over the wire, in order to avoid downward feed of the tape before the punch begins to sever the wire. The slight remaining lost motion is of no consequence, for some slack in the tape as the punch descends tends to be taken up again as the punch rises, the punch tensioning the part of the tape above the clamping fingers. In any event, the punch stroke is not necessarily equal to the spacing of elements on the tape, but is such as to ultimately produce the desired spacing.

It is believed that the construction and operation, as well as the many advantages of my improved slide fastener apparatus, will be apparent from the foregoing detailed description thereof. The apparatus uses a scrapless strip or wire of embryo fastener elements. The apparatus is greatly simplified by the complete elimination of tape feed mechanism, and a highly accurate feed is obtained by using the punch which severs the endmost element from the wire, as a means for feeding the element together with the tape the desired amount for proper spacing of the elements along the tape. The wire feed mechanism is simplified by the elimination of a holding dog. A gap or space may be provided by simply locking the feed arm in outermost position following which the tape is fed despite the absence of fastener elements thereon, by the engagement of the preferably serrated side wall of the punch with the beaded edge of the tape. Return movement of the tape with the punch is prevented by gripping the tape as the punch rises, and this is preferably done by the same clamping fingers as are used to clamp the elements against the tape. The described relation between the punch and the tape is desirable even when attaching elements to the tape, in order to feed the tape along with the element, and to relieve the strain on the element which has just been attached to the tape. This method of tape feed also helps eliminate undesirable stretching of the tape at the instant of feed.

It will be apparent that while I have shown and described my invention in a preferred form, many changes and modifications may be made in the method and structure disclosed, without departing from the spirit of the invention defined in the following claims. In referring to serrations or tape feed means on the punch, I mean to include the equivalent use of such means on or attached to the punch holder or ram, etc.

I claim:

1. Apparatus for the manufacture of slide fasteners, comprising means to support a tape, means to intermittently feed a jaw-ended wire toward the tape, means to clamp the jaws at the end of the wire against the tape, and a punch movable transversely of the wire to shear and physically move the clamped element away from the end of the wire and to thereby feed the element together with the tape a distance corresponding to the desired spacing of the elements along the tape.

2. Apparatus for the manufacture of slide fasteners, comprising means to support a beaded tape, means to intermittently feed a jaw-ended wire toward said tape, means to clamp the jaws at the end of the wire against the beaded edge of the tape, a punch disposed adjacent the beaded edge of the tape and reciprocable transversely of the wire and in the direction of the tape, and means to reciprocate the punch an amount sufficient to shear the clamped element from the end of the wire and to feed the element together with the tape a distance corresponding to the spacing of the elements along the tape, the timing of the machine being such that the wire is advanced before the clamping means function to clamp the jaws on the tape, and the latter functions before the punch operates to sever the clamped element from the wire.

3. Apparatus for the manufacture of slide fasteners, comprising means to support a beaded tape, means to guide and to intermittently feed a wire toward said tape, said wire having serrated edges corresponding to the ends of spread jaws and having projections and recesses along the faces thereof, said serrations and projections and recesses being so spaced as to correspond to embryo elements with the head of one nested within and filling the space between the spread jaws of the next, means to clamp the jaws at the end of the wire against the beaded edge of the tape, a punch disposed adjacent the beaded edge of the tape and reciprocable transversely of the wire and in the direction of the tape, and means to reciprocate the punch an amount sufficient to shear the clamped element from the end of the wire and to feed the element together with the tape a distance corresponding to the spacing of the elements along the tape.

4. Apparatus for the manufacture of slide fasteners, said apparatus comprising means including a feed dog to intermittently feed a wire, and a severing punch movable transversely of the wire to sever the wire into individual fastener elements, the configuration of the severing punch being such that it interlocks with the severed wire to prevent retraction of the same, thereby dispensing with a holding dog or check dog, the timing of the machine being such that the feed dog advances before the punch operates and retracts before the punch returns.

5. Apparatus for the manufacture of slide fasteners, comprising means to support a tape, means to intermittently feed a wire of embryo fastener elements toward said tape, said elements having a head and spread jaws, means to clamp the jaws against the edge of the tape, and a punch reciprocable transversely of the wire to sever the elements, the configuration of the punch being such that it interlocks with the severed end of the wire to prevent retraction of the wire during retraction of the wire feed means, the timing of the machine being such that the wire is advanced before the punch operates, and the feed means retracts before the punch returns.

6. Apparatus for the manufacture of slide fasteners, comprising means to support a tape, means to intermittently feed a jaw-ended wire toward said tape, means to clamp the jaws at the end of the wire against the edge of the tape, a punch disposed adjacent the edge of the tape and reciprocable transversely of the wire and in the direction of the tape, the configuration of the punch being such that it interlocks with the severed end of the wire to prevent retraction of the wire during retraction of the wire feed means, and means to reciprocate the punch an amount sufficient to shear the clamped element from the end of the wire and to feed the element together with the tape a distance corresponding to the spacing of the elements along the tape, the timing of the machine being such that the wire is advanced before the clamping means function to clamp the jaws on the tape, and the latter functions before the punch operates to sever the clamped element from the wire, and the feed means retracts before the punch returns.

7. Apparatus for the manufacture of slide fasteners, comprising means to guide a beaded tape, means to guide a formed wire, a feed dog to intermittently feed the wire toward said tape, said wire having serrated edges corresponding to the ends of spread jaws and having projections and recesses along the faces thereof, said serrations and projections and recesses being so spaced as to correspond to embryo elements with the head of one nested within and filling the space between the spread jaws of the next, means to clamp the jaws at the end of the wire against the beaded edge of the tape, a punch disposed adjacent the beaded edge of the tape and reciprocable transversely of the wire and in the direction of the tape, the configuration of the punch being such that it interlocks with the severed end of the wire to prevent retraction of the wire during retraction of the feed dog, and means to reciprocate the punch an amount sufficient to shear the clamped element from the end of the wire and to feed the element together with the tape a distance corresponding to the spacing of the elements along the tape, the timing of the machine being such that the wire is advanced before the clamping means function to clamp the jaws on the tape, and the latter clamps and then releases the jaws before the punch operates to sever the clamped element from the wire, and the feed dog retracts before the punch returns.

8. In apparatus for making slide fasteners, means to support and guide a tape, a punch for forming fastener elements, means to attach the fastener elements to the tape, and means carried by the punch for feeding the tape, the stroke of the punch being so selected as to feed the tape an amount equalling the desired pitch or spacing of the elements along the tape.

9. In apparatus for making slide fasteners, a punch having its end shaped to form fastener elements, and having its side serrated to engage and feed a tape.

10. Apparatus for the manufacture of slide fasteners, comprising means to support a tape, means to intermittently feed a jaw-ended wire toward said tape, means to clamp the jaws at the end of the wire against the edge of the tape, a punch disposed adjacent the edge of the tape and reciprocable transversely of the wire and in the direction of the tape, means on said punch for engaging and moving the tape when the punch moves in its cutting direction, means to reciprocate the punch an amount sufficient to shear the clamped element from the end of the wire and to feed the element together with the tape a distance corresponding to the desired spacing of the elements along the tape, and means to periodically interrupt the operation of the wire feed means in order to produce a gap on the tape between stringers, said tape then being fed by the aforesaid means on the punch.

11. Apparatus for the manufacture of slide fasteners, comprising means to support a beaded tape, means to intermittently feed a jaw-ended wire toward said tape, means to clamp the jaws at the end of the wire against the beaded edge of the tape, a punch disposed immediately adjacent the beaded edge of the tape and reciprocable transversely of the wire and in the direction of the tape, the side of said punch which engages the beaded edge of the tape being transversely serrated with teeth facing in the cutting direction of the punch in order to help feed the tape with the punch, and means to reciprocate the punch an amount sufficient to shear the clamped element from the end of the wire and to feed the element together with the tape a distance corresponding to the desired spacing of the elements along the tape.

12. Apparatus for the manufacture of slide fasteners, comprising means to support a beaded tape, means to intermittently feed a jaw-ended wire toward said tape, means to clamp the jaws at the end of the wire against the beaded edge of the tape, a punch disposed immediately adjacent the beaded edge of the tape and reciprocable transversely of the wire and in the direction of the tape, the side of said punch which engages the beaded edge of the tape being transversely serrated with teeth facing in the cutting direction of the punch in order to help feed the tape with the punch, means to reciprocate the punch an amount sufficient to shear the clamped element from the end of the wire and to feed the element together with the tape a distance corresponding to the spacing of the elements along the tape, and means to periodically interrupt the operation of the wire feed means in order to produce a gap on the tape between stringers, said tape then being fed by reason of the engagement between the side of the punch and the tape.

13. Apparatus for the manufacture of slide fasteners, comprising means to support a tape, means to intermittently feed a jaw-ended wire toward said tape, means to clamp the jaws at the end of the wire against the edge of the tape, a punch disposed adjacent the edge of the tape and reciprocable transversely of the wire and in the direction of the tape, means on said punch engaging the tape in order to help feed the tape with the punch, means to reciprocate the punch an amount sufficient to shear the clamped element from the end of the wire and to feed the element together with the tape a distance corresponding to the spacing of the elements along the tape, and means to prevent return movement of the tape when the punch returns.

14. Apparatus for the manufacture of slide fasteners, comprising means to support a tape, means to intermittently feed a jaw-ended wire toward said tape, means to clamp the jaws at the end of the wire against the edge of the tape, a punch disposed adjacent the edge of the tape and reciprocable transversely of the wire and in the direction of the tape, means on said punch engaging the tape in order to help feed the tape with the punch, means to reciprocate the punch an amount sufficient to shear the clamped element from the end of the wire and to feed the element together with the tape a distance corresponding to the spacing of the elements along the tape, means to prevent return movement of the tape when the punch returns, and means to periodically interrupt the operation of the wire feed means in order to produce a gap on the tape between stringers, said tape then being fed by reason of the engagement between the punch carried means and the tape.

15. Apparatus for the manufacture of slide fasteners, comprising means to support a beaded tape, means to intermittently feed a wire toward said tape, said wire having serrated edges corresponding to the ends of spread jaws and having projections and recesses along the faces thereof, said serrations and projections and recesses being so spaced as to correspond to embryo elements with the head of one nested within and filling the space between the spread jaws of the next, means to clamp the jaws at the end of the wire against the beaded edge of the tape, a punch disposed immediately adjacent the beaded edge of the tape and reciprocable transversely of the wire and in the direction of the tape, the side of said punch which engages the beaded edge of the tape being transversely serrated with teeth facing in the cutting direction of the punch in order to help feed the tape with the punch, means to reciprocate the punch an amount sufficient to shear the clamped element from the end of the wire and to feed the element together with the tape a distance corresponding to the desired spacing of the elements along the tape, and means to periodically interrupt the operation of the wire feed means in order to produce a gap on the tape between stringers, said tape then being fed by reason of the engagement between the serrated side of the punch and the tape.

16. Apparatus for the manufacture of slide fasteners, comprising means to support a tape, means to intermittently feed a jaw-ended wire toward said tape, clamping means to clamp the jaws at the end of the wire against the tape, a punch disposed adjacent the edge of the tape and reciprocable transversely of the wire and in the direction of the tape, means on said punch for engaging the tape in order to feed the tape when the punch moves in cutting direction, means to reciprocate the punch an amount sufficient to shear the clamped element from the end of the wire and to feed the element together with the tape a distance corresponding to the spacing of the elements along the tape, means operable to grip the tape to hold the same stationary, the timing of the machine being such that the wire is advanced to the tape, the jaws are clamped on the tape and are then released, the punch severs the element and advances the tape, and the tape is gripped and held stationary as the punch returns, and means to periodically interrupt the operation of the wire feed means in order to produce a gap on the tape between stringers.

17. Apparatus for the manufacture of slide fasteners, comprising means to support a beaded tape, means to intermittently feed a jaw-ended wire toward said tape, clamping means to clamp the jaws at the end of the wire against the tape, a punch disposed immediately adjacent the beaded edge of the tape and reciprocable transversely of the wire and in the direction of the tape, the side of said punch which engages the beaded edge of the tape being transversely serrated in order to help feed the tape with the punch, means to reciprocate the punch an amount sufficient to shear the clamped element from the end of the wire and to feed the element together with the tape a distance corresponding to the spacing of the elements along the tape, means operable to grip the tape to hold the same stationary, the timing of the machine being such that the wire is advanced to the tape, the jaws are clamped on the tape and are then released, the punch operates to sever the element and advance the tape, and the tape is gripped and held stationary as the punch returns, and means to periodically interrupt the operation of the wire feed means in order to produce a gap on the tape between stringers, said tape being fed by continued cooperation of the punch and the tape gripping means.

18. Apparatus for the manufacture of slide fasteners, comprising means to support a tape, means to intermittently feed a jaw-ended wire toward said tape, clamping means oppositely movable at the edge of the tape and adapted to grip the tape or to clamp the jaws at the end of the wire against the tape, a punch disposed adjacent the edge of the tape and reciprocable transversely of the wire and in the direction of the tape, means on said punch for engaging the tape in order to feed the tape when the punch moves in cutting direction, means to reciprocate the punch an amount sufficient to shear the clamped element from the end of the wire and to feed the element together with the tape a distance corresponding to the spacing of the elements along the tape, the timing of the machine being such that the wire is advanced to the tape, the jaws are clamped on the tape and are then released, the punch operates to sever the element and advance the tape, the clamping means grip the tape as the punch returns, and finally the clamping means open preparatory to another forward feed movement of the wire.

19. Apparatus for the manufacture of slide fasteners, comprising means to support a tape, means to intermittently feed a jaw-ended wire toward said tape, clamping means oppositely movable at the edge of the tape and adapted to grip the tape or to clamp the jaws at the end of the wire against the tape, a punch disposed adjacent the edge of the tape and reciprocable transversely of the wire and in the direction of the tape, means on said punch for engaging the tape in order to feed the tape when the punch moves in cutting direction, means to reciprocate the punch an amount sufficient to shear the clamped element from the end of the wire and to feed the element together with the tape a distance corresponding to the spacing of the elements along the tape, the timing of the machine being such that the wire is advanced to the tape, the jaws are clamped on the tape and are then released, the punch operates to sever the element and advance the tape, the clamping means grip the tape as the punch returns, and finally the clamping means open preparatory to another forward feed movement of the wire, and means to periodically interrupt the operation of the wire feed means in order to produce a gap on the tape between stringers, said tape then being fed by the continued cooperation of the punch and the clamping means working on the tape itself.

20. Apparatus for the manufacture of slide fasteners, comprising means to support a beaded tape, means to intermittently feed a jaw-ended wire toward said tape, clamping means oppositely movable at the beaded edge of the tape and adapted to grip the tape or to clamp the jaws at the end of the wire against the tape, a punch disposed immediately adjacent the beaded edge of the tape and reciprocable transversely of the wire and in the direction of the tape, the side of said punch which engages the beaded edge of the tape being transversely serrated in order to help feed the tape with the punch, means to reciprocate the punch an amount sufficient to shear the clamped element from the end of the wire and to feed the element together with the tape a distance corresponding to the spacing of the elements along the tape, the timing of the machine being such that the wire is advanced to the tape, the jaws are clamped on the tape and are then released, the punch operates to sever the element and advance the tape, the clamping means grip the tape as the punch returns, and finally the clamping means open preparatory to another forward feed movement of the wire, and means to periodically interrupt the operation of the wire feed means in order to produce a gap on the tape between stringers, said tape then being fed by the continued cooperation of the punch and the clamping means working on the tape alone.

21. Apparatus for the manufacture of slide fasteners, comprising means to support a beaded tape, means to intermittently feed a jaw-ended wire toward said tape, clamping means oppositely movable at the beaded edge of the tape and adapted to grip the tape or to clamp the jaws at the end of the wire against the tape, a punch disposed immediately adjacent the beaded edge of the tape and reciprocable transversely of the wire and in the direction of the tape, the configuration of the punch being such that it interlocks with the severed end of the wire and prevents retraction of the same, the side of said punch which engages the beaded edge of the tape being transversely serrated in order to help feed the tape with the punch, means to reciprocate the punch an amount sufficient to shear the clamped element from the end of the wire and to feed the element together with the tape a distance corresponding to the spacing of the elements along the tape, the timing of the machine being such that the wire is advanced to the tape, the jaws are clamped on the tape and are then released, the punch operates to sever the element and advance the tape, the wire feed means retracts before the punch returns, the clamping means grips the tape during the return of the punch, and finally the clamping means open preparatory to another forward feed movement of the wire.

22. Apparatus for the manufacture of slide fasteners, comprising means to support a tape, means to feed a wire toward the tape, and a single reciprocable tool having a part on its end for engaging and operating upon the wire to help form fastener elements therefrom and another part along its side for engaging the tape to help intermittently feed the same.

23. Apparatus for the manufacture of slide fasteners, said apparatus including a punch and die for operating on a strip of connected embryo fastener elements, feed means for intermittently feeding said strip, said feed means comprising a cam, a pivoted feed lever having a cam roller bearing against the cam, a feed dog moved by said feed lever for engaging and moving the strip, and means to interrupt feed of the element strip for gap spacing, said means comprising a locking pin slidable longitudinally into a position for engaging the feed lever when the cam has moved the lever to outermost position, a solenoid, and a solenoid core connected to said locking pin, the arrangement being such that energization of the solenoid moves the locking pin into position to lock the feed lever, said pin being moved out of the path of the feed lever when the solenoid is deenergized.

24. In the manufacture of slide fasteners, the method which includes feeding a jaw-ended wire toward the edge of a tape, clamping the jaws at the end of the wire against the tape, severing the already-clamped element from the wire by punching the element in the direction of the tape, by clamped element carrying the tape with it as it is being severed and so being used as a part of the means to feed the tape in order to obtain spacing between elements, and the severing stroke being of such length as to feed the tape for a distance equalling the desired pitch or spacing of the elements along the tape.

25. In the manufacture of slide fasteners, the method which includes preliminarily forming a wire having serrated sides edges and projections and recesses along opposite faces thereof, said serrations and projections and recesses being so spaced as to correspond to embryo fastener elements with spread jaws and with the head of one element nested within and filling the space between the spread jaws of the next, feeding said wire jaw first toward the beaded edge of a tape, clamping the jaws at the end of the wire against the tape, severing the already-clamped element from the wire by punching the element in the direction of the tape, the clamped element carrying the tape with it as it is being severed and so being used as a part of the means to feed the tape in order to obtain spacing between elements, and the severing stroke being of such length as to feed the tape for a distance equalling the desired pitch or spacing of the elements along the tape.

26. In apparatus for the manufacture of slide fasteners, means to guide a tape, means to intermittently feed the tape in one direction, clamping fingers on opposite sides of said tape, and cam means to move the clamping fingers toward one another in alternate stages having different strokes of movement, one of which stages brings the fingers together an amount suitable to clamp the jaws of an element against the tape, and the other of which stages brings the fingers together an amount greater than for clamping an element as aforesaid and suitable to grip the tape itself, in order to prevent unintended or undesired movement of the tape between the intended feed movements.

GEORGE WINTRITZ.

Disclaimer 2,302,084.—*George Wintritz*, Staten Island, N. Y. MANUFACTURE OF SLIDE FASTENERS. Patent dated Nov. 17, 1942. Disclaimer filed Dec. 5, 1947, by assignee, *Conmar Products Corporation*.

Hereby enters disclaimer to claim 23 of said patent.

[*Official Gazette January 6, 1948.*]